(12) United States Patent
Boamfa et al.

(10) Patent No.: US 10,221,080 B2
(45) Date of Patent: Mar. 5, 2019

(54) RECIPIENT WITH VARIABLE GEOMETRY FOR UV WATER PURIFICATION

(71) Applicant: PHILIPS LIGHTING HOLDING B.V., Eindhoven (NL)

(72) Inventors: Marius Iosif Boamfa, Eindhoven (NL); Marius Gabriel Ivan, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 66 days.

(21) Appl. No.: 15/116,611

(22) PCT Filed: Jan. 29, 2015

(86) PCT No.: PCT/EP2015/051748
§ 371 (c)(1),
(2) Date: Aug. 4, 2016

(87) PCT Pub. No.: WO2015/121071
PCT Pub. Date: Aug. 20, 2015

(65) Prior Publication Data
US 2016/0355410 A1    Dec. 8, 2016

(30) Foreign Application Priority Data

Feb. 11, 2014 (EP) ..................... 14154714

(51) Int. Cl.
*C02F 1/32* (2006.01)
*C02F 1/00* (2006.01)

(52) U.S. Cl.
CPC ............. *C02F 1/325* (2013.01); *C02F 1/008* (2013.01); *C02F 2201/3221* (2013.01); *C02F 2201/3228* (2013.01); *C02F 2303/04* (2013.01)

(58) Field of Classification Search
CPC .... C02F 1/00; C02F 1/32; C02F 1/008; C02F 1/325; C02F 2201/3221; C02F 2201/3228; C02F 2303/04
USPC ......................................................... 210/739
See application file for complete search history.

(56) References Cited

U.S. PATENT DOCUMENTS

| 3,589,862 | A | 6/1971 | Veloz |
| 6,312,608 | B1 * | 11/2001 | Buckner ................... A23L 2/50 |
| | | | 210/748.03 |
| 7,520,978 | B2 | 4/2009 | Harbers |
| 2008/0044320 | A1 | 2/2008 | Traubenberg et al. |
| 2014/0202962 | A1 * | 7/2014 | Bilenko .................. C02F 1/325 |
| | | | 210/748.11 |

FOREIGN PATENT DOCUMENTS

| JP | S5754443 A | 3/1982 |
| JP | 2006346676 A | 12/2006 |
| JP | 2012143731 A | 8/2012 |

(Continued)

*Primary Examiner* — Robert Clemente
*Assistant Examiner* — Akash K Varma
(74) *Attorney, Agent, or Firm* — Akarsh P. Belagodu

(57) ABSTRACT

A fluid disinfection system comprising at least one UV light source to provide UV radiation into a chamber. The chamber containing an amount of fluid to be disinfected and fitted with at least one adjustable wall. The adjustable wall positioned on an upper surface of the fluid to reflect UV radiation within the amount of liquid. This adjustable wall effectively providing a variable volume chamber in which fluid disinfection can occur.

11 Claims, 4 Drawing Sheets

(56) References Cited

FOREIGN PATENT DOCUMENTS

| | | |
|---|---|---|
| JP | 2013006608 A | 1/2013 |
| JP | 2013066835 A | 4/2013 |
| WO | 2010058607 A1 | 5/2010 |

\* cited by examiner

RECIPIENT WITH VARIABLE GEOMETRY FOR UV WATER PURIFICATION

CROSS-REFERENCE TO PRIOR APPLICATIONS

This application is the U.S. National Phase application under 35 U.S.C. § 371 of International Application No. PCT/EP2015/051748, filed on Jan. 29, 2015, which claims the benefit of European Patent Application No. 14154714.1, filed on Feb. 11, 2014. These applications are hereby incorporated by reference herein.

FIELD OF THE INVENTION

The invention relates to the field of fluid disinfection, and more specifically to UV LED fluid disinfection

BACKGROUND OF THE INVENTION

The importance of fluid disinfection for providing a fluid that contains fewer harmful bacteria has widely been recognized. This becomes even more prescient when the fluid in question is, for example, water that is being prepared for human or animal consumption.

Fluid disinfection with UV radiation was first used in the 1980's; it has numerous advantages over other methods such as chlorination, especially when the fluid is water that is to be consumed. UV radiation does not affect the PH, composition, taste or odor of the fluid that has been disinfected. The disinfection of the fluid is achieved by deactivating the DNA of bacteria, viruses and microbes. Further advantages of the use of UV to disinfect fluids are simple installation, less maintenance requirements and space efficiency. Furthermore the use of UV to treat the fluid eliminates the need to use a chemical process thus removing the risk of a chemical smell or taste in the fluid after disinfection has been completed.

Current UV water disinfection technologies mainly use mercury discharge lamps to provide the UV radiation that disinfects the water. Generally these systems provide UV radiation to fluids flowing past them.

U.S. Pat. No. 7,520,978 discloses a system for purifying a fluid using ultra violet (UV) light to inactivate microorganisms present in the fluid. The system has an arrangement of UV light emitters on perforated plates. The fluid, while passing through perforations in the perforated plates, is exposed to the UV light emitted by the UV light emitters. Micro-organisms present in the fluid pass very close to the UV light emitters. The UV light absorbed by the micro-organisms causes genetic damage and inactivation. The system has feedback units providing feedback about the physical properties of the fluid to a power unit supplying power to the UV light emitters. The power unit varies the amount of power supplied to the UV light emitters, based on the feedback.

Ultraviolet (UV) radiation disrupts the DNA of microbes and thereby prevents reproduction. Without reproduction, the microbes become far less of a danger to health. As such UV radiation is a mutagen, that is to say, UV radiation creates mutations within the structure of DNA. UV-C radiation in the short wavelength range of 100-280 nm acts on thymine, one of the four base nucleotides in DNA, when a UV photon is absorbed by a thymine molecule that is adjacent to another thymine within a DNA strand, a covalent bond or dimer between the molecules may be created, this is different to the normal structure of DNA wherein the bases always pair up with the same partner on the opposite strand of DNA. This causes a bulge to occur between the two bases, the bulge prevents enzymes from "reading" the DNA and copying it, thus neutering the microbe.

Some pathogens are hundreds of times less sensitive to UV radiation and the subsequent risk of mutations than others. Viruses may require a 10-30 times greater dose of UV light than Giardia or Cryptosporidium which are protozoa.

SUMMARY OF THE INVENTION

It is an object of the invention to provide a fluid disinfection system that may decrease the time period required to disinfect the fluid based on the amount of fluid to be disinfected A fluid disinfection system in accordance with the first aspect of the invention comprises a chamber for accepting an amount of fluid and at least one UV light source for providing UV radiation in the chamber. The chamber comprises at least one adjustable wall which is configured to float upon a surface of the fluid within the chamber and to remain in fluid contact when the fluid level is increased or decreased, thus adjusting the volume of the chamber to the amount of fluid and wherein the chamber further comprises at least a portion of UV reflective material.

A method of disinfecting an amount of fluid in accordance with the second aspect of the invention comprises the steps of;

providing an amount of fluid to a chamber, the chamber comprising at least one adjustable wall of which the position is adjustable relative to the chamber, wherein the chamber further comprises at least one adjustable wall of which the position is adjustable relative to the chamber;

adjusting the position of the adjustable wall to conform to the amount of fluid such that the chamber is substantially entirely filled with the amount of fluid; and providing UV radiation to the amount of fluid contained in the chamber.

It is the insight of the inventors that the use of UV LEDs to provide UV radiation to an amount of fluid may increase the efficiency of the whole system when compared to existing systems by being more electrically efficient and also having a longer service life than conventional technologies. There is a limitation to the use of UV LEDs and that is due to the low operating power available. This means that it is very important to manage the illumination in order to achieve the desired UV treatment dose in the shortest possible time.

It is a further insight of the inventors that a fluid disinfection system may be tailored to provide a shorter disinfection time by disinfecting a smaller amount of fluid when throughput time is important and a longer disinfection time by disinfecting a larger amount of fluid when throughput time is of less importance.

This is made possible by the inclusion of a variable geometry chamber with at least one adjustable wall within the fluid disinfection system. Fluid is provided into the variable geometry chamber and the position of the adjustable wall is adjusted such that the chamber is substantially entirely filled with the amount of fluid. The adjustable wall reflects the UV radiation and as the adjustable wall is preferably in fluid contact with the upper surface of fluid within the chamber the UV radiation is contained within the amount of fluid and is reflected numerous times by the geometry of the chamber.

The adjustable wall has two main surfaces, a first surface and a second surface; the second surface may be in fluid contact with the amount of fluid in the chamber and as such shall be referred to hereafter as the fluid contact surface.

The adjustable wall ensures that UV radiation does not exit the amount of fluid and consequently travel into a region of air within the chamber which would be the result if the adjustable wall did not define the available fluid amount. This is advantageous as the UV radiation that exits from the fluid is almost entirely lost due to many consecutive reflections above the fluid surface. The exit angle of the radiation is small relative to the fluid surface due to the difference in refractive indices between the fluid and the air above. This small angle means that the radiation is reflected many times above the fluid and it has a higher chance of being absorbed by the walls of the chamber than being returned to the fluid. The wall reflectivity is the same above and below the fluid level, it is the number of consecutive reflections that increase the absorption of the UV radiation above the fluid.

In an embodiment, the volume of the chamber can be defined by the amount of fluid that is introduced to the chamber, the adjustable wall is configured to float upon an upper surface of the fluid and to remain in fluid contact so that the position of the adjustable wall is self-adjusting.

In a further embodiment the adjustable wall is positioned before the fluid is introduced into the chamber, this adjusts the volume of the chamber and thus dictates the amount of fluid that can be introduced into the chamber. The adjustable wall may be positioned in numerous ways; this may include but is not limited to, a rack and pinion design wherein the pinion is driven by a motor and the rack forms part of a stem extending from a first surface of the adjustable wall, i.e. the surface of the wall that is not configured to be in contact with the amount of fluid, the motor may further be of a stepper motor type construction. The adjustable wall may be placed on the end of a mechanism such as an arm wherein the position of the arm is dictated by the action of a motor, it may simply be placed on the end of an arm wherein the end of the arm that is not connected to the adjustable wall may protrude through a housing surrounding the chamber such that a user may adjust the position of the protruding lever part and preferably engage it with a locking mechanism which may be as simple as a series of notches to act like a ratchet.

In an embodiment the at least one UV Light source may be situated below the adjustable wall, this ensures that the UV radiation that is transmitted into the chamber substantially remains within the amount of fluid, thus reducing the amount of UV radiation that may be lost by numerous consecutive reflections of the UV radiation in a volume of air within the chamber.

In a yet further embodiment the chamber may be provided with a UV transparent window, this window allows the transmission of UV radiation that is emitted by the UV light source into the chamber.

In an embodiment the UV transparent window may further comprise a quartz window, quartz may be used because it has a high UV transmission and it has a low coefficient of thermal expansion. This low coefficient will allow the quartz to experience rapid or large temperature changes without cracking, known as thermal shock.

In a further embodiment at least a portion of the UV transparent window may comprise a lens structure. This lens structure may tailor the beam of the UV radiation to the requirements of the system; this may be collimation of the beam, diffusion of the beam or any manipulation that proves advantageous.

In another embodiment the adjustable wall may be provided with a through hole, this through hole may allow fluid to be provided into the chamber. The through hole allows the fluid to be added to the chamber without requiring the removal of the adjustable wall from the chamber; this may prove advantageous to the user by further simplifying the operation of the system.

In a further embodiment the adjustable wall may have a narrow clearance between a side face and the chamber; the side face may comprise an edge if the adjustable wall is constructed from a sheet-like material. The narrow clearance may preferably be provided around the periphery of the adjustable wall. This clearance may allow fluid to be provided on to the face of the adjustable wall that is not configured to be in contact with the fluid in the chamber and to subsequently allow the fluid to pass through the narrow clearance into the chamber in order to be disinfected. A narrow clearance is preferable as it may limit the amount of UV radiation that can escape from the chamber.

In a yet further embodiment the adjustable wall has a series of through openings around the boundary of said adjustable wall. These openings extend from the first surface to the second surface of the adjustable wall. The purpose of these openings is to allow the providing of an amount of fluid to the chamber. Utilizing a series of openings around the boundary of the adjustable of the adjustable wall maintains the alignment of the adjustable wall within the chamber.

In a further embodiment the through hole may be provided with a valve, this valve may facilitate the management of fluid flow into and out of the chamber. In one embodiment the adjustable wall may be positional to control the available fluid amount within the chamber; once the disinfection is completed the adjustable wall may be forced towards the base of the chamber. The valve may be opened to control the egress of fluid from the chamber, preferably a pipe may be provided to deliver the fluid to a convenient location for collection by a user.

A yet further embodiment may provide a one way flap type valve, these valves are a very simple way of preventing the backflow of fluid from one area to another, thus preventing the disinfected fluid from passing back through the adjustable wall and being mixed with fluid that has not yet been disinfected, this may prevent a portion of the disinfected fluid from being disinfected a second time. This may further decrease the wasting of UV radiation and therefore increases the efficiency of the system.

In a further embodiment the adjustable wall may be removable from the chamber; this may facilitate the providing of an amount of fluid into the chamber. A safety device to either prevent the wall being removed whilst UV radiation is being transmitted into the amount of fluid or a cut-off wherein the UV Light source(s) stop transmitting UV radiation when the adjustable wall is removed may preferably be provided. In both cases this is to prevent harmful UV radiation from entering the eyes of a user.

In a yet further embodiment the at least one UV Light source may be positioned on the fluid contact surface of the adjustable wall. This may ensure that the UV Light source(s) are preferably irradiating the amount of fluid irrespective of the amount of fluid within the chamber.

In a further embodiment the at least one UV light source may be recessed into the fluid contact surface of the adjustable wall and the recess may be preferably covered with a UV transparent window to prevent fluid contact with the at least one UV light source.

In a yet further embodiment the at least one light source may be positioned on the first surface of the adjustable wall and provides UV radiation into the chamber through a UV transparent window.

In a further embodiment the fluid exit may be located below the fluid contact surface of the adjustable wall. This may bring advantages of simplicity to the system as the inlet to the exit pipe would always be below the fluid level.

In a yet further embodiment the fluid entry into the chamber may be located below the fluid contact surface of the adjustable wall. Even more preferably the delivery pipe that feeds this fluid entry starts from a position that is higher than the maximally extended position of the adjustable wall. This may ensure that the addition of fluid into the chamber will cause the floating adjustable wall to travel upwards inside the chamber. The advantages of this technique are that the adjustable wall doesn't need to be removed from the chamber and so a tighter clearance between the adjustable wall and the chamber may be used. An air bleed valve is preferably fitted to the adjustable wall to ensure that the air trapped within the chamber can be evacuated before disinfection commences. If the adjustable wall is positioned by other means, such as a rack and pinion arrangement or a hydraulic plunger system then the air bleed valve is preferably open when fluid is being added to the system otherwise an airlock may occur and the fluid may not flow into the chamber.

In a yet further embodiment the light source may provide UV radiation into a light guide. This light guide may be positioned at the base of the chamber, it may be a portion of the base or it may be the entire base of the chamber. In this embodiment the base of the chamber is the face opposite the adjustable wall and extending between the base and the adjustable wall is at least one side wall. This at least one sidewall may preferably extend beyond the adjustable wall. The light guide is preferably provided with out-coupling structures on a face which may provide UV radiation to the amount of fluid within the chamber. The light guide may also be provided with a layer of UV reflective material opposite the out-coupling structures to ensure the UV radiation is reflected back into the amount of fluid and does not escape from the chamber.

In a further embodiment multiple light sources may be arranged to provide UV radiation into the amount of fluid within the chamber through the at least one side wall. The multiple light sources may be orientated such that individual light sources are switched off as the position of the adjustable wall moves past them to provide UV radiation to the amount of fluid in a controlled manner, i.e. UV radiation is not emitted by the light sources which may not be transmitted into the amount of fluid contained within the chamber.

The meaning of the term adjustable wall is that the position of the wall is adjusted within the chamber with respect to other non-adjustable geometries. The dimensions of the wall are not adjustable in service.

The fluid disinfection used herein could also be combined with other known fluid treatment techniques such as filtration; this may reduce the occurrence of solid matter in the fluid and may prevent damage to the fluid disinfection system.

The chamber and the adjustable wall may preferably be manufactured from a UV reflective material; such reflection may be diffuse reflection or specular reflection.

A method for disinfecting an amount of fluid may preferably further comprise the steps of;
measuring the amount of fluid within the chamber,
calculating a required dose of UV radiation to be provided to the amount of fluid, and
providing the required dose of UV radiation to the amount of fluid.

The measurement of the amount of fluid could be achieved by, but not limited to; a weight measurement of the fluid, a measurement of the position of the adjustable wall within the chamber or a flow meter.

The calculation of the required dosage of the UV radiation to be provided to the amount of fluid may be achieved by; measuring the amount of the fluid and then applying empirical data showing the required energy input to the fluid per unit of mass or volume to achieve a safe level of log reduction of the number of viable micro-organisms present in the fluid.

The calculation of the required dosage and also control of the UV light source(s), fluid flow(s) and other parts of the system may be executed by a processing unit wherein software code portions have been configured for, when executed on the processing unit, performing the steps of the method.

These and other aspects of the invention will be apparent from and elucidated with reference to the embodiment(s) described hereinafter.

DETAILED DESCRIPTION OF THE INVENTION

Like features within the embodiments will be referenced with like numerals within the Figures.

Figure 1:
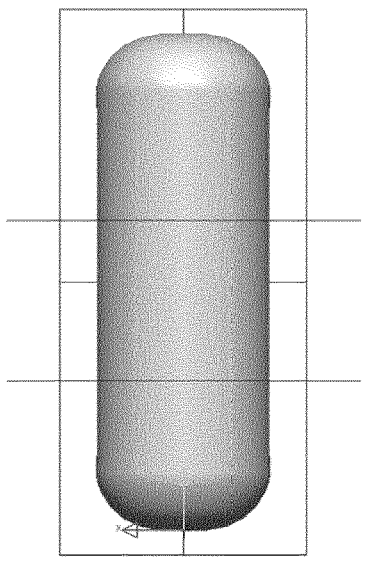
FIG. 1 shows a prior art chamber that is not fitted with an adjustable wall.

FIG. 1 shows a prior art chamber of fixed volume for use within a fluid disinfection system.

Figure 2:
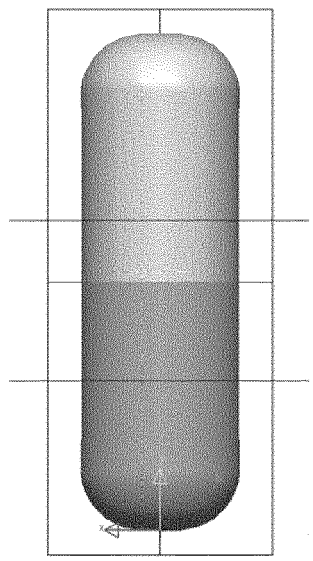
FIG. 2 shows a chamber that is not fitted with an adjustable wall that is half filled with fluid.

FIG. 2 shows a prior art chamber of fixed volume half filled with an amount of fluid, there is a volume of air visible above the upper surface of the fluid.

Figure 3:
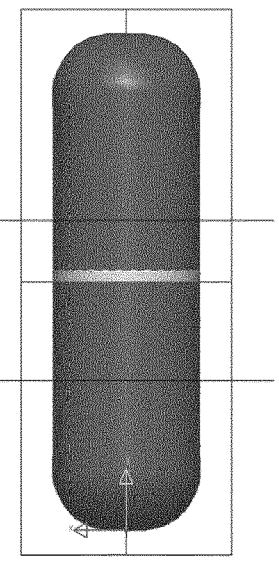
FIG. 3 shows a chamber with an adjustable wall, this wall has created a volume below the level of the adjustable wall, this volume allowing a smaller amount of fluid to be disinfected when compared with the chamber shown in FIG. 1.

FIG. 3 shows a chamber fitted with an adjustable wall, the adjustable wall will limit the volume of the chamber to the amount of the fluid that is to be disinfected. The adjustable wall may preferably be manufactured from a material with a UV reflectance. A suitable material for the construction of the adjustable wall could be selected from a substrate that is coated with aluminum but could also be manufactured from aluminum and then polished. Other suitable materials may include but are not limited to, Silver (Ag), Gold (Au), Copper (Cu), Rhodium (Rh) and Titanium (Ti)

Figure 4:
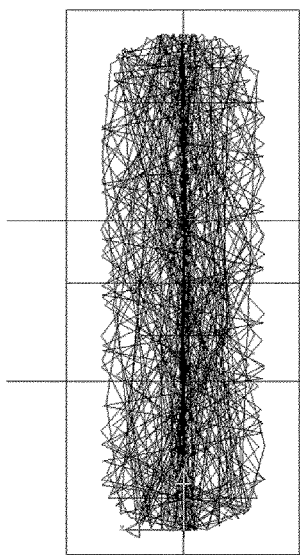
FIG. 4 shows the ray path produced by several light rays within the total chamber of FIG. 1.

FIG. 4 shows a trace of a ray path produced by several light rays within the total chamber as shown in FIG. 1. It can be seen that the light rays have a substantially uniform distribution over the entire volume of the chamber and that the light rays reflect off the surface of the chamber walls in a uniform distribution. The chamber walls are specularly reflective as it can be seen that the entry and exit angle of the light rays to the chamber walls are similar.

Figure 5:
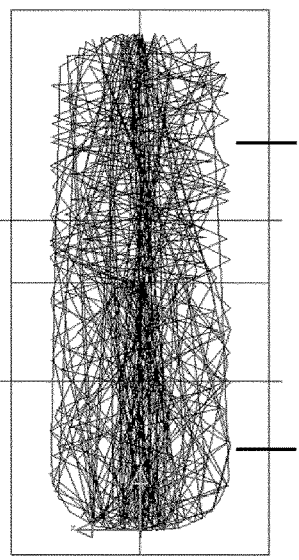
FIG. 5 shows the ray path produced by several light rays within the chamber of FIG. 2 that is half filled with fluid. It can be seen that the light rays reflect more frequently on the side surfaces of the chamber above the fluid surface than below the fluid surface.

FIG. 5 shows a trace of a ray path produced by several light rays within the half-filled chamber as shown in FIG. 2. It can be seen that the light rays within region A have a higher number of reflections than those in region B. This is because Region B is an amount of fluid, whereas region A is a volume of air. When a light ray exits the amount of fluid, i.e. when it passes through an upper surface of the fluid, the exit angle of the light ray is small relative to the fluid surface due to the difference in refractive indices between the fluid and the air above. This small angle means that the radiation is reflected many times by the walls of the chamber in the volume of air and it has a higher chance of being absorbed by the walls of the chamber than passing back through the upper surface of the fluid and thus into the amount of fluid. This may be explained by the fact that the light rays are being reflected around within the chamber at a small angle relative to the surface of the fluid, this means that when the light rays impinge on the upper surface of the fluid they are reflected back away from the surface because of the shallow angle of incidence. When the light ray is in the volume of air it is ineffective and does not contribute to the disinfection of the amount of fluid thus leading to a loss of efficiency compared with a chamber that is filled entirely with fluid.

Figure 6:
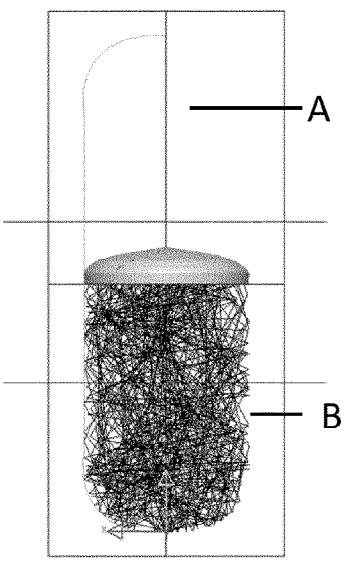
FIG. 6 shows the ray path produced by several light rays within the chamber fitted with an adjustable wall as shown in FIG. 3.

FIG. 6 shows a trace produced by several light rays within an amount of fluid in a chamber that is provided with an adjustable wall. It can be seen that the light is contained within region B. Region B is the amount of fluid that is provided below the fluid contact surface of the adjustable wall. It can also be seen that there is no light being transmitted into the air filled region A through the upper surface of the fluid. Therefore no numerous subsequent reflections of the light after impingement upon the chamber walls in the air-filled region occur. This limits the amount of light energy that is lost due to the light absorption of the wall of the chamber. The UV light is contained within the fluid, this means that the energy of the light is confined to the fluid thus increases the efficiency of the fluid disinfection and may lead to a corresponding reduction in the amount of time that is required to disinfect the fluid.

Figure 7:
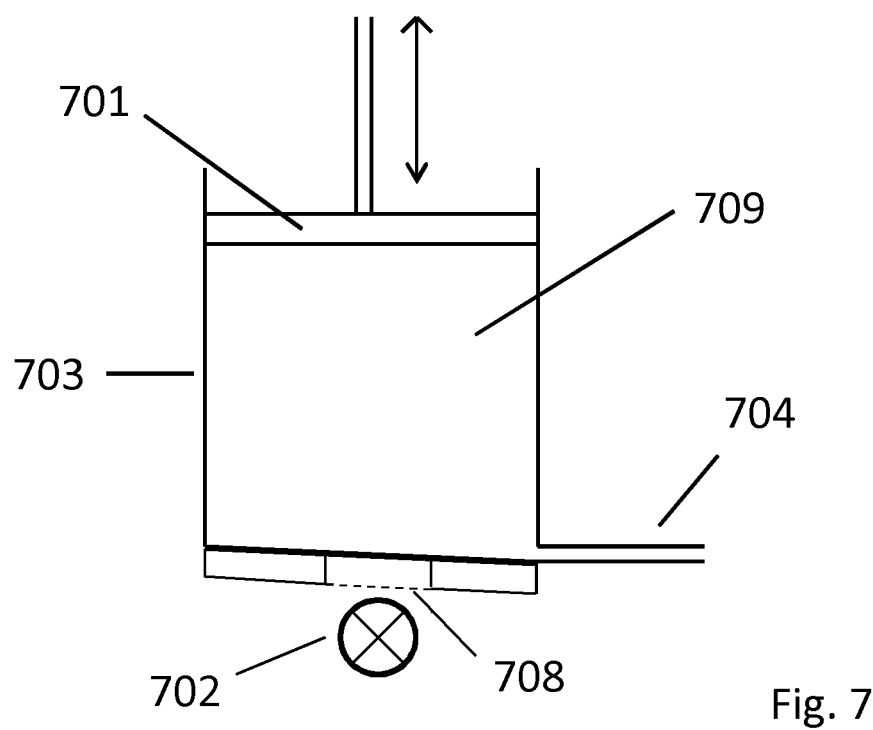
FIG. 7 shows a sectional view of an embodiment of a chamber fitted with an adjustable wall, the chamber comprising a base and at least one side wall. The base of the chamber is the face opposite the adjustable wall and the at least one side wall extends between the base and the adjustable wall. The at least one side wall preferably extends beyond the adjustable wall. Said adjustable wall configured to provide a variable volume chamber between the position of the adjustable wall and the base of the chamber.

FIG. 7 shows a sectional view of an embodiment of the fluid disinfection system wherein a chamber 703 is provided with an adjustable wall 701. This adjustable wall may be adjusted within the chamber to provide a variable volume within the chamber. The chamber comprising a base and at least one side wall. The base of the chamber is the face opposite the adjustable wall and the at least one side wall extends between the base and the adjustable wall. The at least one side wall preferably extends beyond the adjustable wall. Said adjustable wall configured to provide a variable volume chamber between the position of the adjustable wall and the base of the chamber.

At least one UV light source 702 is provided to emit UV radiation into the chamber in order to disinfect the fluid 709 contained therein. Fluid exit 704 is provided to remove the fluid once disinfection is complete. The fluid exit preferably comprises a valve to prevent fluid egress from the chamber until disinfection of the fluid has been completed by ensuring that a suitable dose of UV radiation has been applied to the amount of fluid.

Figure 8:
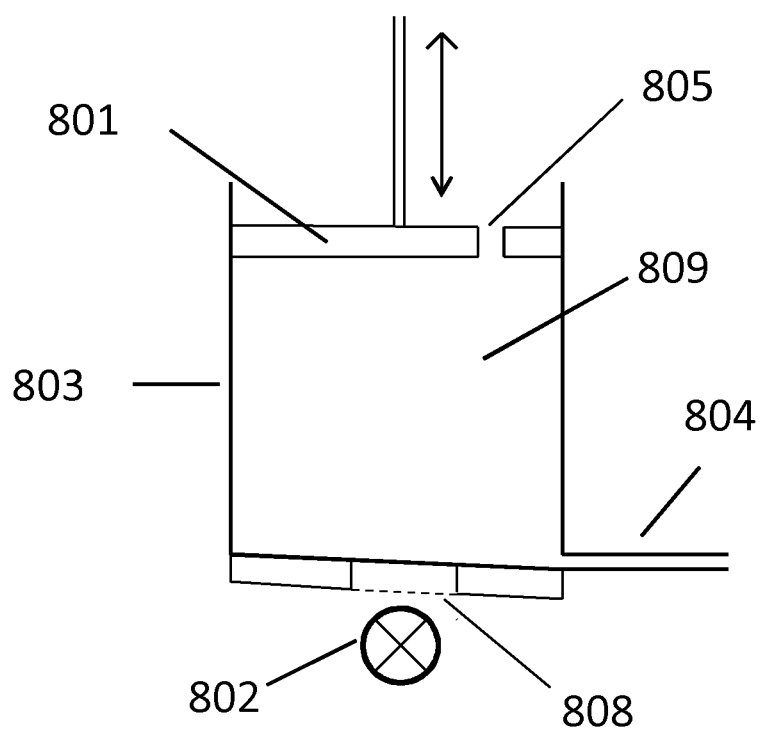
FIG. 8 shows a sectional view of an embodiment of a chamber fitted with an adjustable wall, the position of the wall being mechanically or manually adjustable, said adjustable wall is provided with a through hole to allow an amount of fluid to be provided to the chamber.

FIG. 8 shows a sectional view of an embodiment of the fluid disinfection system wherein a chamber 803 is provided with an adjustable wall 801. The position of the adjustable wall is adjustable within the chamber in order to provide a variable volume within the chamber; the position may be adjustable mechanically or manually. The adjustable wall is further provided with a through hole 805. This through hole allows the chamber 803 to be filled with a fluid without having to remove the adjustable wall from the chamber. The through hole would preferably further comprise a valve, such valve may be a one-way valve, said valve may ensure that fluid is able to enter the chamber but that the UV radiation is contained within the amount of fluid 809. At least one light source 802 is provided in one or more of the following positions; the base of the chamber, which is the face opposite the adjustable wall or the at least one side wall which extends between and preferably beyond the base and the adjustable wall. This positioning ensures that the UV radiation transmitted into the chamber is reflected by the fluid contact surface of the adjustable wall almost irrespective of the position of the adjustable wall within the chamber. The reflectance of the UV radiation by the fluid contact surface of the adjustable wall limits the volume that the UV radiation can travel within to the amount of fluid within the chamber and may increase the efficacy of the fluid disinfection system.

Figure 9:
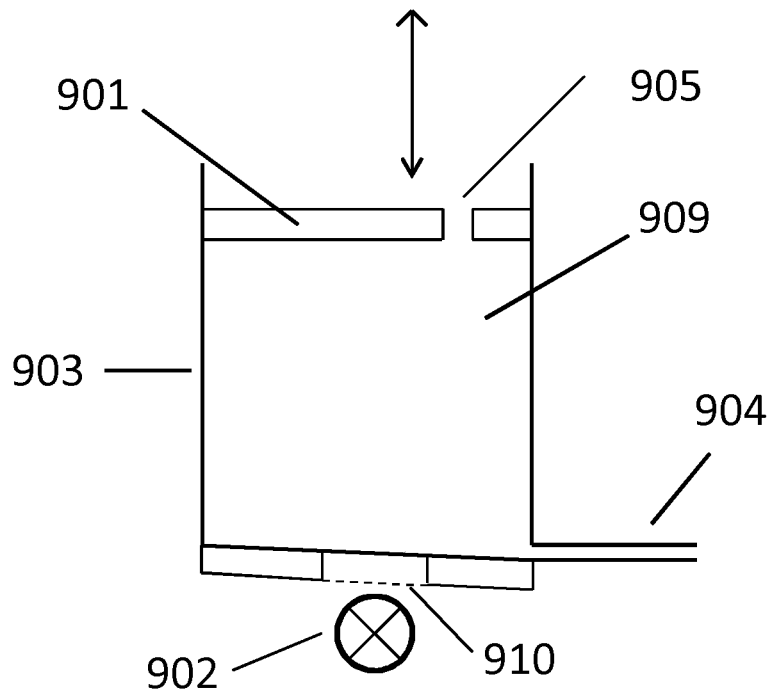
FIG. 9 shows a sectional view of a yet further embodiment of a chamber fitted with an adjustable wall, the adjustable wall is configured to float upon an upper surface of the amount of fluid contained within the chamber and to have a position which is self-adjusting dependent on the fluid level of the amount of fluid contained within the chamber. The adjustable wall may be removable from the chamber to facilitate the providing of an amount of fluid to the chamber.

FIG. 9 shows a sectional view of a further embodiment of the fluid disinfection system wherein a chamber 903 is fitted with an adjustable wall 901. In this embodiment the adjustable wall is configured to float on an upper surface of the fluid 909 contained in the chamber. The adjustable wall position is influenced by the level of fluid within the chamber; namely, the greater the amount of fluid that is present in the chamber, the further away from the base of the chamber the adjustable wall will be positioned. The adjustable wall 901 is a close fit within the chamber 903 to reduce the amount of UV radiation that may escape the amount of fluid and the subsequent loss of efficiency. The adjustable wall 901 may be removable from the chamber to facilitate providing an amount of fluid to the chamber. At least one light source 902 is provided in one or more of the following positions; the base of the chamber, which is the face opposite the adjustable wall or the at least one side wall which extends between and preferably beyond the base and the adjustable wall. This positioning ensures that the UV radiation transmitted into the chamber is reflected by the fluid contact surface of the adjustable wall almost irrespective of the position of the adjustable wall within the chamber. A fluid exit 904 is provided to remove the fluid from the chamber once disinfection is complete.

Figure 10:
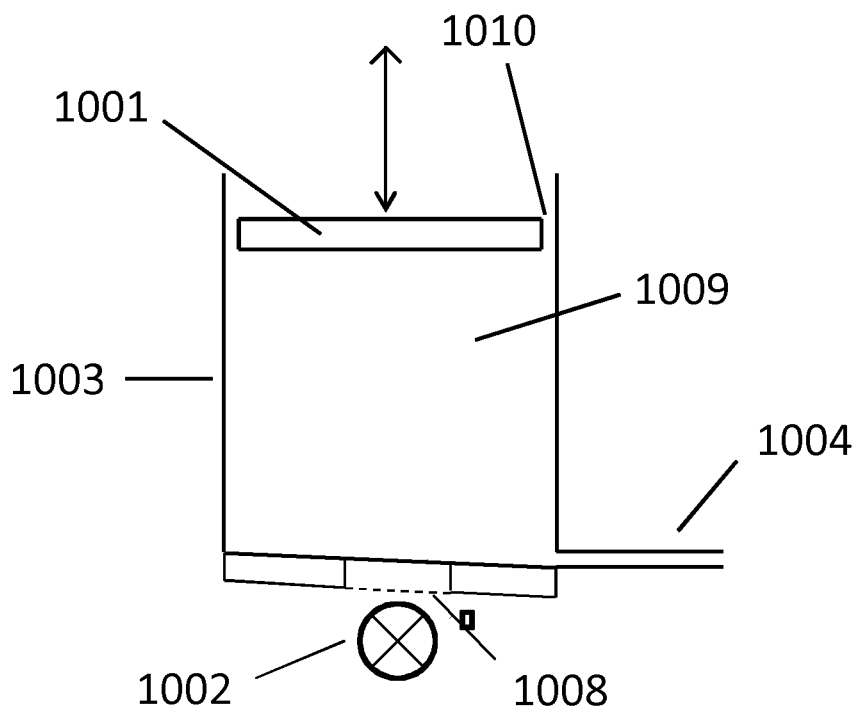
FIG. 10 shows a sectional view of a yet further embodiment of a chamber fitted with an adjustable wall, the figure shows an clearance between the adjustable wall and the chamber, this clearance has been exaggerated for the sake of clarity.

FIG. 10 is a sectional view of a yet further embodiment of a fluid disinfection system wherein a chamber 1003 is provided with an adjustable wall 1001, the adjustable wall is configured to float upon an upper surface of the fluid amount 1009 that is within the chamber 1003. The fluid enters the chamber by passing through the small clearance gap 1010 (exaggerated in this figure to improve the clarity) between the adjustable wall 1001 and the chamber 1003. This gap should be designed so that the fluid can be provided to the chamber in as short a time period as practical whilst minimizing the escape of UV radiation from the chamber. This is important for both efficacy of disinfection and also user safety. An at least one light source 1002 is provided below the fluid contact surface of the adjustable wall to emit UV radiation into the amount of fluid. The UV light source may be positioned below the fluid contact surface of the adjustable wall to ensure that UV radiation is transmitted into the amount of fluid irrespective of the amount of fluid and thus the position of the adjustable wall 1001. A fluid exit 1004 is provided to facilitate the removal of the amount of fluid from the chamber 1003 once disinfection is complete.

In a further embodiment (not shown), the clearance distance between the adjustable wall and the at least one side wall of the chamber is minimized and openings are provided around the boundary of the adjustable wall. These openings extend from the first surface to the second surface of the adjustable wall. The purpose of these openings is to allow the providing of an amount of fluid to the chamber. Utilizing a series of openings around the boundary of the adjustable wall maintains the alignment of the adjustable wall within the chamber by allowing a close seal between the adjustable wall and the at least one side wall of the chamber whilst still allowing an amount of fluid to be provided to the chamber.

In a further embodiment of a fluid disinfection system (not shown), a chamber is provided with an adjustable wall. A fluid entry to the chamber is provided wherein the height of the entry is higher than the maximum extended position of the adjustable wall. This allows the adjustable wall to float upon the upper surface of the amount of fluid and to rise when fluid is added. Due to the fluid entry into the chamber being below the fluid contact surface of the adjustable wall a close seal between the adjustable wall and the chamber is possible and this may reduce the loss of UV radiation from the chamber thus increasing the efficacy of disinfection and also the risk of any UV radiation harming a user. Any air present inside the chamber before the addition of the amount of fluid would be trapped by the adjustable wall and may prevent the amount of fluid from entering the chamber, therefore an air bleed valve may be provided. This air bleed valve allows the escape of any air trapped within the chamber and so ensures that the volume of the chamber below the fluid contact surface of the adjustable wall is filled with fluid. A valve is preferably fitted to the fluid exit to prevent the amount of fluid from exiting the chamber until disinfection is complete. An at least one UV light source is provided below the fluid contact surface of the adjustable wall to emit UV radiation into the amount of fluid irrespective of the position of the adjustable wall within the chamber.

Figure 11:
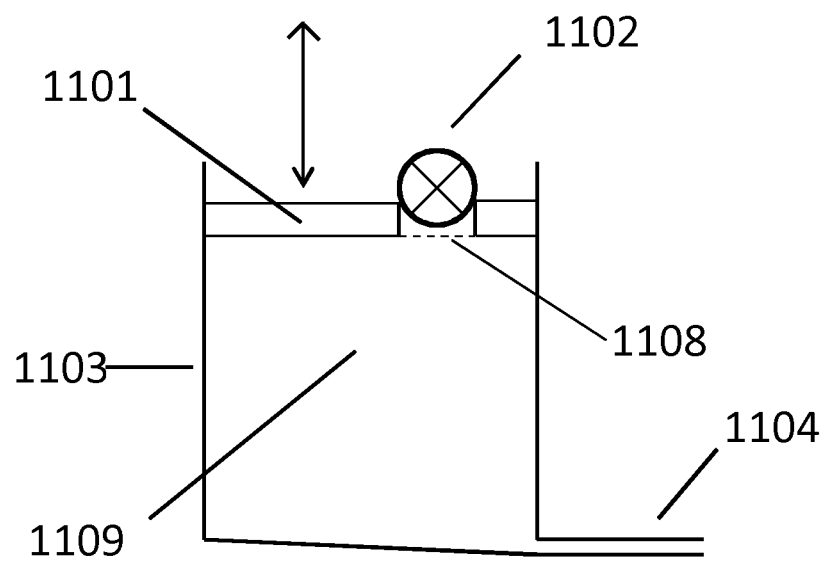
FIG. 11 shows a sectional view of a further embodiment of a chamber fitted with an adjustable wall, the UV light source is mounted in a recess in the fluid contacting surface of the adjustable wall.

FIG. 11 is a sectional view of a further embodiment of a fluid disinfection system wherein a chamber 1103 is fitted with an adjustable wall 1101. The adjustable wall is provided with an at least one UV light source 1102, said light source configured to emit UV radiation. The UV light source may preferably be covered by a window constructed from a material with a high UV transmittance such as quartz. This window prevents the at least one UV light source from contacting the fluid 1109, this may prolong the life of the light source. A fluid exit 1104 is provided to allow the removal of the fluid from the chamber 1103 once disinfection has been completed.

Figure 12:
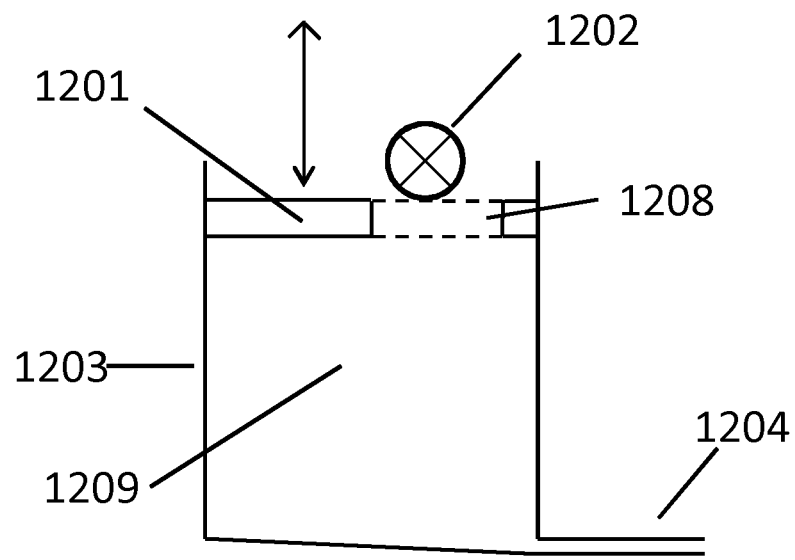
FIG. 12 shows a sectional view of a further embodiment of a chamber fitted with an adjustable wall wherein the UV light source is mounted on a first surface of the adjustable wall.

FIG. 12 is sectional view of an embodiment of a fluid disinfection system wherein a chamber 1203 is provided with an adjustable wall 1201. The adjustable wall is provided with at least a portion of material with a high UV transmittance 1208. The portion of material 1208 prevents the fluid 1209 from contacting the at least one UV light source. Such contact may prove deleterious to the UV light source 1202. The portion of material 1208 allows the UV light emitted by the UV light source to be transmitted into the amount of fluid that is contained within the chamber 1203. This arrangement may prove advantageous as it ensures that the light from the UV light source is always transmitted into the amount of fluid contained in the chamber 1203 irrespective of the position of the adjustable wall 1201. The adjustable wall 1201 may float upon an upper surface of the amount of fluid and the position of the adjustable wall within the chamber will therefore be influenced by the amount of fluid that is provided to the chamber. A fluid exit 1204 is provided to allow the removal of the fluid from the chamber 1203 once disinfection is complete; preferably the fluid exit is fitted with a valve to prevent the egress of fluid before the disinfection is completed.

The invention claimed is:

1. A fluid disinfection system comprising:
    a chamber having a volume for accepting an amount of fluid,
    at least one UV light source for providing UV radiation to the chamber, and
    at least one adjustable chamber wall,
    wherein the adjustable wall is configured to float upon a surface of the fluid within the chamber and to remain in fluid contact when a fluid level of the amount of fluid is increased or decreased, thus adjusting the volume of the chamber to the amount of fluid so as to contain the UV radiation in the amount of fluid, and wherein the chamber further comprises at least a portion of UV reflective material.

2. The fluid disinfection system according to claim 1 wherein the chamber is provided with a UV transparent window, said window for providing transmission of the UV radiation emitted by the at least one UV light source into said chamber.

3. The fluid disinfection system according to claim 2 wherein at least a portion of the UV transparent window further comprises a lens structure.

4. The fluid disinfection system according to claim 3 wherein the UV transparent window further comprises a quartz window.

5. The fluid disinfection system according to claim 1 wherein the adjustable wall has a through hole for providing an amount of fluid into the chamber.

6. The fluid disinfection system according to claim 5 wherein the through hole is provided with a valve.

7. The fluid disinfection system according to claim 1 wherein the adjustable wall is removable to facilitate the providing of an amount of fluid within the chamber.

8. The fluid disinfection system according to claim 1 wherein the adjustable wall has a first surface and a second surface, said second surface is configured to be in contact with the amount of fluid within the chamber, and the at least one UV light source is integrated within the adjustable wall and covered with a UV transparent member to prevent fluid contact with the at least one light source or the at least one light source is positioned on the second surface of said adjustable wall.

9. The fluid disinfection system according to claim 1 wherein a fluid exit is located below said adjustable wall.

10. A method for disinfecting an amount of fluid, comprising the steps of:
   providing an amount of fluid to a chamber, the chamber having a volume for accepting an amount of fluid, wherein said chamber further comprises at least one adjustable wall configured to float upon a surface of the fluid within the chamber; and
   providing UV radiation to the amount of fluid contained in the chamber.

11. The method for disinfecting an amount of fluid according to claim 10 further comprising the steps of:
   measuring the amount of fluid within the chamber,
   calculating a required dose of UV radiation to be provided to the amount of fluid, and
   providing the required dose of UV radiation to the amount of fluid.

* * * * *